United States Patent
Joy, Jr. et al.

[11] 3,784,929
[45] Jan. 8, 1974

[54] THERMALLY-CONTROLLED CRYSTALLINE LASERS

[75] Inventors: Patrick Francis Joy, Jr., Turnersville; Donald George Herzog, Collingswood, both of N.J.

[73] Assignee: RCA Corporation, New York, N.Y.

[22] Filed: Oct. 30, 1972

[21] Appl. No.: 302,298

[52] U.S. Cl. ................................. 331/94.5, 330/4.3
[51] Int. Cl. ............................................. H01s 3/04
[58] Field of Search .................... 331/94.5; 330/4.3; 317/234 R, 234 A, 234 B

[56] References Cited
UNITED STATES PATENTS

| | | | |
|---|---|---|---|
| 3,222,615 | 12/1965 | Holly | 331/94.5 |
| 3,297,957 | 1/1967 | Merkl | 331/94.5 |
| 3,654,567 | 4/1972 | Hodgson | 331/94.5 |

*Primary Examiner*—William L. Sikes
*Attorney*—Glenn H. Bruestle, Geo. J. Seligsohn and Irwin M. Krittman

[57] ABSTRACT

The use of a crystalline laser element itself as the evaporator of a heat-pipe is achieved by fluting a surface of the element with capillary grooves for the heat-pipe working fluid. This maintains the surface at a substantially uniform temperature.

7 Claims, 3 Drawing Figures

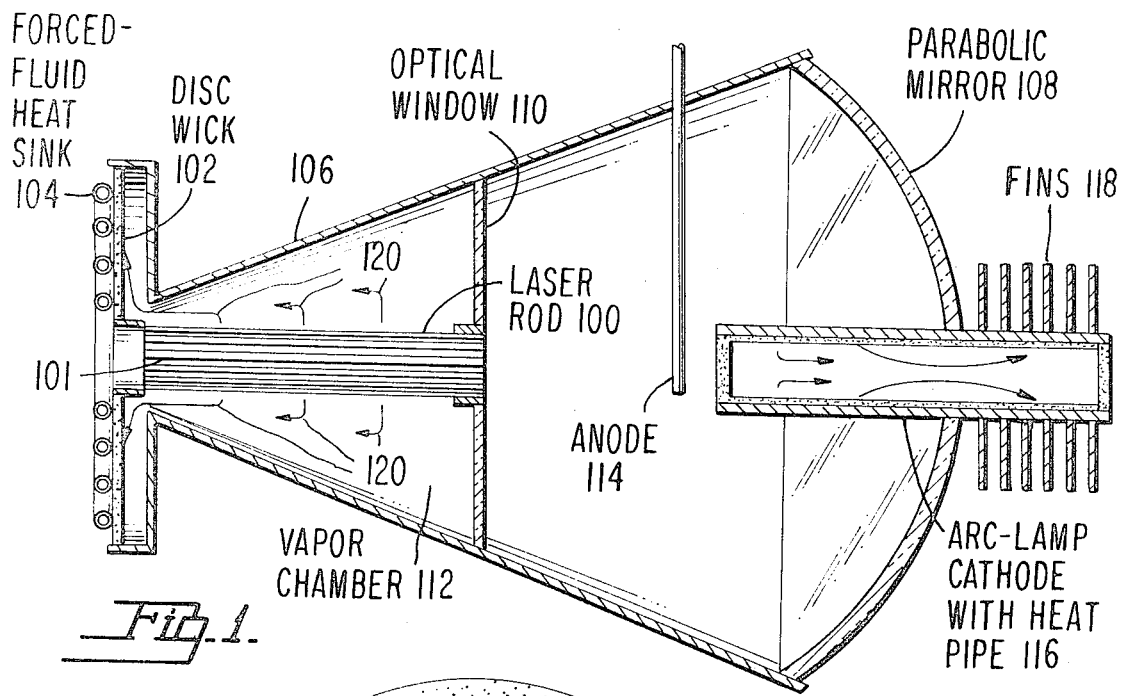
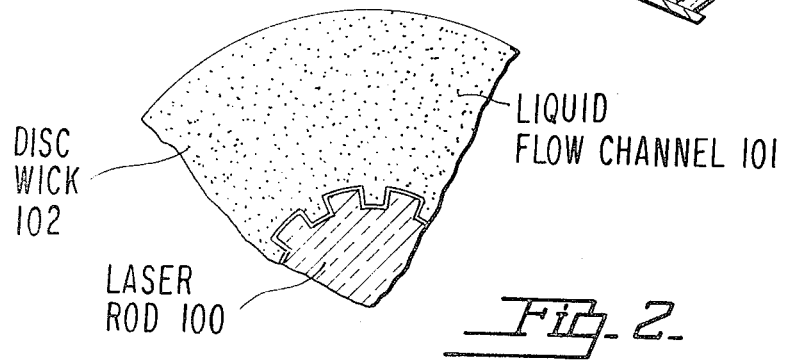
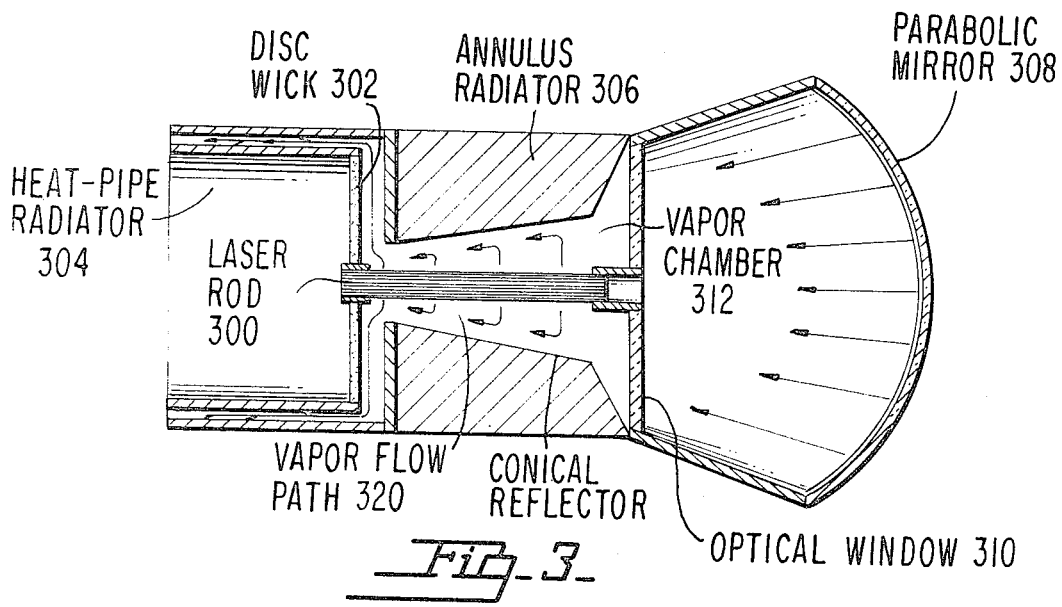

THERMALLY-CONTROLLED CRYSTALLINE LASERS

This invention relates to crystalline lasers and, more particularly, to thermally-controlled crystalline lasers.

As is known, the operation of crystalline lasers, such as ruby, YAG, etc., at high efficiencies and substantially constant output requires that heat generated during operation be removed and the temperature of the crystalline laser rod be carefully controlled. In the past, this has been accomplished by employing a plurality of conductive heat sinks directly in contact with portions of the surface of the laser rod. Heat is removed from the heat sinks either by radiation or by a circulating cooling fluid. More recently, there has been developed a technique for removing heat from the laser rod with a pressurized gas, such as nitrogen, which is circulated past the surface of the laser rod to a heat exchanger.

The present invention is directed to a thermal control system for crystalline lasers which is more reliable in maintaining the temperature of the laser rod constant over its entire surface than prior art systems. Furthermore, the thermal control system of the present invention is essentially simple and inherently of low weight. In particular, the thermal control system of the present invention makes use of a heat-pipe which incorporates the crystalline laser element itself as the heat-pipe working-fluid evaporator. This is accomplished by configuring a given surface of the crystalline laser tube to perform as a heat pipe evaporator. This may be done by fluting the surface with a plurality of capillary-size grooves for the working fluid.

These and other features and advantages of the present invention will become more apparent from the following detailed description taken together with the accompanying drawing, in which:

FIG. 1 is a first embodiment of a thermal control system for crystalline lasers employing the present invention;

FIG. 2 is a fragmentary showing of the discwick employed in the present invention, as shown in FIG. 1, and its relationship with the crystalline laser rod element thereof, and FIG. 3 is a second embodiment of a thermal control system for crystalline lasers employing the present invention.

Referring now to FIG. 1, there is shown crystalline laser rod element 100, which is in the form of a cylinder. By way of example, the length of element 100 may be about three inches and the diameter thereof may be about ¼ inch. The left and right ends are normally reflective to provide an optical resonant cavity for the laser, as is conventional. In any case, the cylindrical surface thereof is fluted with a plurality of capillary-sized grooves 101 which extend from the left end toward the right end thereof. Preferably, as shown in FIG. 1, the grooves 101 are oriented substantially parallel to the cylindrical axis of element 100 and extend the entire length between the left and right ends thereof. By way of example, typical cross sectional dimensions of each of the grooves 101 is in the order of ten mils. Attached solely to the left end of rod element 100 is disc-wick 102. Disc-wick 102 is permeated with the heat-pipe working fluid.

As shown in FIG. 1 and, in more detail, in FIG. 2, disc-wick 102 has a cross section substantially larger than, but substantially parallel to, that of rod 100. Disc-wick 102 is composed of a porous material which is capable of absorbing within its pores a quantity of the heat pipe working fluid in liquid form. By way of example, disc-wick 102 may be made out of nickel or copper felt, fiberglass, or several layers of metallic or non-metallic fine mesh. The material employed for the working fluid depends upon the desired operating temperature of the laser element. By way of example, the working fluid may be ammonia, alcohol, various Freons, or even water, depending upon the selected operating temperature of the surface of element 100. For instance, alcohol would be suitable for an operating temperature of about 20° Centigrade; ammonia would be suitable for an operating temperature up to about 50° Centigrade, while water would be suitable for an operating temperature of about 100° Centigrade.

As shown in FIG. 1, disc-wick 102 has a heat sink, such as forced-fluid heat sink 104, associated therewith. As further shown in FIG. 1, an enclosure, comprising metallic housing 106 is attached to a periphery of disc-wick 102 and surrounds laser rod element 100. Housing 106 includes a conical reflective portion symmetrically disposed about laser rod element 100.

The right end of housing 106 is terminated in parabolic mirror 108. Located intermediate disc-wick 102 and parabolic mirror 108 and situated within the conical portion of housing 106 is optical window 110 which, has a central portion thereof attached to the right end of laser rod element 100 and has its periphery attached to the interior reflective surface of housing 106. Therefore, disc-wick 102, optical window 110 and the portion of housing 106 to the left of optical window 110 define an enclosed region of space 112 forming a vapor chamber surrounding laser rod element 100.

An arc lamp composed of anode 114 and cathode 116, situated as shown in FIG. 1, is capable of generating intense pumping light for crystalline laser rod element 100. In the embodiment shown in FIG. 1, arc lamp cathode 116 includes its own heat pipe for removing heat from the arc formed between anode 114 and the left end of cathode and radiating this heat from fins 118 attached to the right end of arc-lamp cathode 116.

As is conventional, in operation laser rod element 100 is optically pumped by light. This light is generated by the arc between anode 114 and cathode 116 which illuminates rod element 100. Reflection of light from parabolic mirror 108 and the conical interior of housing 106 and the transmission of light through optical window 110 provide for efficient illumination of rod element 100 with the light generated by the arc.

In response thereto, as is well known in the art, crystalline rod element 100 generates coherent light energy by stimulated emission. This coherent light energy is transmitted in an axial direction from at least one end of the rod, by making at least one of the end reflectors partially transmissive. The efficiency with which this coherent wave energy is generated depends both directly and indirectly upon the temperature distribution throughout the rod. In particular, the output of the laser is directly related to temperature because the gain of the laser is affected by temperature. The output of the laser is indirectly related to temperature distribution because mechanical strains and stresses due to assymetrical differences in temperature from point to point throughout the rod affect the index of refraction and, hence, the optical transmission characteristics of rod element 100. It would therefore be ideal to maintain the entire outer surface of the rod element 100 at the same preselected temperature which is chosen to be that at which output and efficiency are maximum. The heat pipe of which rod element 100 forms the evaporator makes it possible to approach this ideal condition.

In particular, capillary grooves 101 are coupled to disc-wick 102 so that working fluid present in liquid form within the pores of disc-wick 102 flows by capillary action into grooves 101. The heat generated by the operating laser causes the liquid working fluid within the grooves 101 to vaporize. In vapor form, the working fluid leaves grooves 101 and is replaced by additional working fluid in liquid form flowing from disc-wick 102. However, the working fluid in vapor form which leaves groove 101 carries away a large quantity of heat from laser rod element 100, in the process of evaporating, as latent heat of vaporization. Furthermore, since vapor chamber 112 is enclosed, this vapor cannot escape. Instead, it condenses in the relatively cooler, outer regions of disc-wick 102, where heat is removed therefrom by heat sink 104. The condensed fluid then flows by capillary action through the pores of disc-wick 102 back to grooves 101. Thus, circulation of the working fluid, as indicated by arrows 120, takes place and results in the removal of heat from the surface of laser rod element 100 and the delivery of this heat to heat sink 104. The important fact, however, is that the removal of heat from all points on the cylindrical surface of laser rod element 100 takes place at the same temperature, i.e. the saturation temperature of the working fluid at the saturation vapor pressure within vapor chamber 112. By selecting the appropriate working fluid within vapor chamber 112, the vaporization temperature of the working fluid and hence the operating temperature of the entire surface of laser rod element 100 may be preselected and controlled with high reliability.

FIG. 3 shows a thermal control system employing the present invention which is particularly suitable for use in a satellite, since it is low in weight and employes no moving parts. In particular, laser rod element 300, which is identical in all material respects to laser rod element 100, has its left end coupled to disc-wick 302. Disc wick 302 is terminated at its periphery in heat-pipe radiator 304 for radiating heat into space. Therefore, heat-pipe radiator 304 serves the same purpose as forced-fluid heat sink 104.

Laser rod element 300 is confined in an enclosed region of space 312, forming a vapor chamber, which is defined by optical window 310, annulus radiator 306, disc-wick 302 and heat pipe radiator 304. Parabolic mirror 308 and the conical reflecting interior of annulus radiator 306 illuminates laser rod element 300 with pumping light derived from sunlight reflected from parabolic mirror 308. Sunlight in FIG. 3 replaces the light derived from the arc lamp comprising anode 114 and cathode 116 of FIG. 1. Vapor flow path 320 shows the manner in which heat is removed by evaporation of the working fluid from laser rod element 300 and disposed of by radiation into space by heat pipe radiator 304.

The two embodiments of the invention shown in FIGS. 1 and 3 are only meant to be illustrative. The principle of employing a crystalline laser element as a heat-pipe evaporator for removing heat from the laser element and maintaining the laser element surface at a substantially uniform preselected temperature can be achieved in many other crystalline laser arrangements from those shown specifically in FIG. 1 and FIG. 3.

What is claimed is:

1. A thermally-controlled crystalline laser comprising a heat pipe having a sealed envelope containing a working fluid and including an evaporator portion and a condensor portion, said evaporator portion incorporating a given surface of a crystalline laser element, said given surface being formed with first capillary means therein, and said condensor portion incorporating second capillary means coupled to said first capillary means, whereby heat generated by said laser during operation is removed from said element and said given surface of said element is maintained at a given temperature determined by said working fluid.

2. The laser defined in claim 1, wherein said laser element is a cylindrical rod having its cylindrical surface fluted with a plurality of capillary-sized grooves for said working fluid extending from one end thereof toward the other end thereof, whereby said fluted cylindrical surface constitutes said given surface.

3. The laser defined in claim 2, wherein said grooves are oriented substantially parallel to the cylindrical axis of said rod and extend the entire length between said one end and said other end.

4. The laser defined in claim 2, wherein the cross sectional dimensions of each of said grooves is in the order of ten mils.

5. The laser defined in claim 2, wherein said condensor portion includes a disc-wick permeated with said working fluid, said disc-wick being attached to said rod solely at said one end thereof and having a cross section substantially larger than but substantially parallel to that of said rod.

6. The laser defined in claim 5, further including a heat sink coupled to said disc-wick.

7. The laser defined in claim 5, wherein said enclosure means includes a transparent portion for permitting pumping illumination originating outside of said region of space to enter thereon and pump said laser rod.

* * * * *